(12) United States Patent
Zhang et al.

(10) Patent No.: US 12,529,871 B2
(45) Date of Patent: Jan. 20, 2026

(54) OPTICAL IMAGING LENS AND IMAGING DEVICE (71) Applicant: JIANGXI LIANCHUANG ELECTRONIC CO., LTD., JiangXi (CN)

(72) Inventors: Xinyue Zhang, JiangXi (CN); Kemin Wang, JiangXi (CN); Jiyong Zeng, JiangXi (CN)

(73) Assignee: JIANGXI LIANCHUANG ELECTRONIC CO., LTD., JiangXi (CN)

( * ) Notice: Subject to any disclaimer, the term of this patent is extended or adjusted under 35 U.S.C. 154(b) by 340 days.

(21) Appl. No.: 18/038,971

(22) PCT Filed: Nov. 24, 2021

(86) PCT No.: PCT/CN2021/132792
§ 371 (c)(1),
(2) Date: May 25, 2023

(87) PCT Pub. No.: WO2022/111524
PCT Pub. Date: Jun. 2, 2022

(65) Prior Publication Data
US 2024/0004168 A1 Jan. 4, 2024

(30) Foreign Application Priority Data
Nov. 26, 2020 (CN) .................... 202011346249.X (51) Int. Cl.
*G02B 13/00* (2006.01)
*G02B 9/64* (2006.01)

(52) U.S. Cl.
CPC ............. *G02B 13/006* (2013.01); *G02B 9/64* (2013.01); *G02B 13/0045* (2013.01)

(58) Field of Classification Search
CPC .. G02B 13/006; G02B 13/0045; G02B 13/06; G02B 13/18; G02B 13/005; G02B 9/64;
(Continued)

(56) References Cited

U.S. PATENT DOCUMENTS

2008/0297915 A1* 12/2008 Yamada ............... G02B 15/177
359/689
2020/0301105 A1* 9/2020 Jung ...................... G02B 21/36

FOREIGN PATENT DOCUMENTS

CN 109541780 A * 3/2019 ........... G02B 13/006
CN 109960020 A 7/2019
(Continued)

OTHER PUBLICATIONS

Chinese disclosure and translation (Year: 2019).*
Translation of International Search report and Written Opinion of Application No. PCT/CN2021/132792, dated Feb. 9, 2022.

*Primary Examiner* — Travis S Fissel
(74) *Attorney, Agent, or Firm* — Meunier Carlin & Curfman LLC (57) ABSTRACT

The invention discloses an optical imaging lens and imaging equipment. The optical imaging lens sequentially comprises, from an object side to an imaging surface along an optical axis, a first lens having negative focal power and with the object side surface to be a convex surface and the image side surface to be a concave surface, a second lens having negative focal power and with the object side surface to be a concave surface and the image side surface to be a convex surface, a third lens having positive focal power and with both the object side surface and the image side surface to be convex surfaces, a diaphragm, a fourth lens having positive focal power and with both the object side surface and the image side surface to be convex surfaces, a fifth lens having positive focal power and with both the object side surface and the image side surface to be convex surfaces, a sixth lens (Continued)

having negative focal power and with both the object side surface and the image side surface to be concave surfaces, and forming a cemented lens group with the fifth lens, and a seventh lens having positive focal power and with both the object side surface and the image side surface to be convex surfaces. The optical imaging lens provided by the invention has the characteristics of ultrahigh resolution, good thermal stability, large imaging surface and convenience in assembly.

19 Claims, 4 Drawing Sheets

(58) Field of Classification Search
CPC ... G02B 9/62; G02B 9/60; G02B 1/00; G02B 27/0012
USPC ......... 359/656–658, 708, 713, 749, 756–762
See application file for complete search history.

(56) References Cited

FOREIGN PATENT DOCUMENTS

| | | |
|---|---|---|
| CN | 110133828 A | 8/2019 |
| CN | 110794552 A | 2/2020 |
| CN | 111856727 A | 10/2020 |
| CN | 112485890 A | 3/2021 |
| JP | 2003307677 A | 10/2003 |

* cited by examiner

OPTICAL IMAGING LENS AND IMAGING DEVICE

CROSS REFERENCE

The present application claims priority to the prior Chinese patent application No. 202011346249.X, filed on Nov. 26, 2020 and entitled "OPTICAL IMAGING LENS AND IMAGING EQUIPMENT," a copy of which is incorporated herein in its entirety.

TECHNICAL FIELD

The invention relates to the technical field of imaging lens, and particularly relates to an optical imaging lens and imaging equipment.

BACKGROUND ART

With the development of the automatic driving technology, ADAS (Advanced Driver Assistant System) has already become the standard configuration in vehicles. Among others, a vehicle-mounted camera lens, as one of the key devices of ADAS, can sense road conditions around the vehicle in real time and perform the functions such as forward collision warning, lane offset alarm and pedestrian detection. Its performance directly affects the safety factor of ADAS. Therefore, there are increasingly higher requirements for the performance of a vehicle-mounted camera lens.

An optical imaging lens, carried in ADAS and applied to the front of a vehicle, acts mainly to identify the situation in front of the vehicle. It is required to be able to clearly distinguish obstacles 100 meters away and effectuate collision warning. This requires that the lens has ultra-high resolution to realize that an object in front occupies enough pixel units in the image to effectively distinguish the details of the road environment. At the same time, the lens is also required to have excellent thermal stability and great image resolution in outdoor high- and low-temperature environments. However, most lenses currently available cannot well meet the above requirements. Therefore, it is urgent to develop an optical imaging lens high in resolution, large in imaging surface, and capable of cooperating with ADAS.

SUMMARY OF THE INVENTION

For this purpose, the objective of the invention lies in providing an optical imaging lens and imaging equipment so as to solve the problem noted above.

According to the embodiments of the invention, the aforesaid objective is accomplished by the following technical solutions.

In the first aspect, the invention provides an optical imaging lens, sequentially comprising, from an object side to an imaging surface along an optical axis, a first lens, a second lens, a third lens, a diaphragm, a fourth lens, a fifth lens, a sixth lens and a seventh lens. Among them, the first lens has negative focal power, an object side surface thereof being a convex surface and an image side surface thereof being a concave surface; the second lens has negative focal power, an object side surface thereof being a concave surface and an image side surface thereof being a convex surface; the third lens has positive focal power, both an object side surface and an image side surface thereof being convex surfaces; the diaphragm is disposed between the third lens and the fourth lens; the fourth lens has positive focal power, both an object side surface and an image side surface thereof being convex surfaces; the fifth lens has positive focal power, both an object side surface and an image side surface thereof being convex surfaces; the sixth lens has negative focal power, both an object side surface and an image side surface thereof being concave surfaces, which forms a cemented lens group with the fifth lens; and the seventh lens has positive focal power, both an object side surface and an image side surface thereof being convex surfaces; wherein the first lens, the second lens, the third lens, the fourth lens, the fifth lens and the sixth lens are glass spherical lenses, and the seventh lens is a glass aspherical lens; and the optical imaging lens satisfies a conditional formula of: $7<TTL/ImgH<8$, where TTL represents a total optical length of the optical imaging lens, and ImgH represents half of the maximum diameter of an effective pixel area of the optical imaging lens on the imaging surface.

In the second aspect, the invention provides an imaging equipment, comprising an imaging element and an optical imaging lens provided in the first aspect, the imaging element being used to convert an optical image formed by the optical imaging lens into an electrical signal.

Compared with the prior art, the optical imaging lens and imaging equipment provided by the invention have ultra-high image resolution by means of the reasonable configuration of various lens surface types and the reasonable matching of focal powers, so as to have the characteristics such as good thermal stability, large imaging surface and convenience of assembly while achieving good imaging quality, which can well meet the requirements of ADAS for lens. Moreover, all glass lenses used therein can ensure the reliable quality of the lens to a great extent so as to make the same applicable to the fields involving a harsh environment.

BRIEF DESCRIPTION OF THE DRAWINGS

The above and/or additional aspects and advantages of the invention will become apparent and easy to understand from the description of the embodiments with reference to the following drawings, among which.

DETAILED DESCRIPTION OF THE EMBODIMENTS OF THE INVENTION

In order to make the objective, features and advantages of the invention more obvious and easier to understand, the specific embodiments of the invention will be described in detail below with reference to the drawings. Several embodiments of the invention are illustrated in the drawings. However, the invention may be implemented in many different forms, not limited to the embodiments as described herein. On the contrary, these embodiments are provided in order to make the disclosure of the invention more thorough and comprehensive.

Unless otherwise defined, all technical and scientific terms herein carry the same meanings as those generally understood by those skilled in the technical field of the invention. The terms in the specification of the invention are only used for the purpose of describing specific embodiments and are not intended to limit the invention. The term "and/or" herein includes any and all combinations of one or more of relevant listed items.

The invention provides an optical imaging lens, sequentially comprising, from an object side to an imaging surface along an optical axis, a first lens, a second lens, a third lens, a diaphragm, a fourth lens, a fifth lens, a sixth lens and a seventh lens. Among them, the first lens has negative focal power, an object side surface thereof being a convex surface and an image side surface thereof being a concave surface; the second lens has negative focal power, the object side surface thereof being a concave surface and an image side surface thereof being a convex surface; the third lens has positive focal power, both an object side surface and an image side surface thereof being convex surfaces; the diaphragm is disposed between the third lens and the fourth lens; the fourth lens has positive focal power, both an object side surface and an image side surface thereof being convex surfaces; the fifth lens has positive focal power, both an object side surface and an image side surface thereof being convex surfaces; the sixth lens has negative focal power, both an object side surface and an image side surface thereof being concave surfaces, the fifth lens and the sixth lens forming a cemented lens group; and the seventh lens has positive focal power, both an object side surface and an image side surface thereof being convex surfaces; wherein the first lens, the second lens, the third lens, the fourth lens, the fifth lens and the sixth lens are glass spherical lenses, and the seventh lens is a glass aspherical lens.

In some embodiments, the optical imaging lens satisfies a condition as below:

$$7 < TTL/ImgH < 8 \tag{1}$$

where TTL represents a total optical length of the optical imaging lens, and ImgH represents half of the maximum diameter of an effective pixel area of the optical imaging lens on the imaging surface. If the condition (1) is satisfied, the total length of the lens can be better compressed while a large image surface is gained, such that the optical imaging lens can achieve miniaturization in design, thereby making it convenient to carry the same on other imaging equipment.

In some embodiments, the optical imaging lens satisfies conditions as below:

$$R6/R5 < -2.8; \tag{2}$$

$$-5.8 < R8/R7 < -3.8; \tag{3}$$

where R5 represents a radius of curvature of the object side surface of the third lens, R6 represents a radius of curvature of the image side surface of the third lens, R7 represents a radius of curvature of the object side surface of the fourth lens, and R8 represents a radius of curvature of the image side surface of the fourth lens. If the conditions (2) and (3) are satisfied, the relative position of the pupil images of the secondary reflection ghost images on the image side surfaces of the third lens and the fourth lens on a focal plane can be changed. By controlling the radiuses of curvature, the pupil images of the ghost images can be made away from the focal plane, which effectively reduces the relative energy value of the ghost images and improves the quality of the picture imaged by the lens.

In some embodiments, the optical imaging lens satisfies a condition as below:

$$(CRA)_{max} < 14°; \tag{4}$$

where $(CRA)_{max}$ represents the maximum value of an incident angle of full-field chief rays of the optical imaging lens on the image surface. If the condition (4) is satisfied, the CRA (Chief Ray Angle) of the lens can be better matched with the CRA of the photosensitive element of a chip, which improves the photosensitive efficiency of the chip.

In some embodiments, the optical imaging lens satisfies a condition as below:

$$-1.8 < f5/f6 < -1.4; \tag{5}$$

where f5 represents a focal length of the fifth lens, and f6 represents a focal length of the sixth lens. If the conditional (5) is satisfied, chromatic aberration can be eliminated or reduced by means of the gluing of two positive and negative focal power lenses, i.e., the fifth positive lens and the sixth negative lens.

In some embodiments, the optical imaging lens satisfies a condition as below:

$$9 < TTL/T34 < 11; \tag{6}$$

where T34 represents a spacing distance between the third lens and the fourth lens on the optical axis, and TTL represents a total optical length of the optical imaging lens. If the condition (6) is satisfied, the rear end optical system is made far away from the front end by increasing the spacing between the third lens and the fourth lens, and the object rays of different fields of view diverge at a certain angle after they are converged by the third lens, and then converge to a further vertical axis position, thereby increasing the image height.

In some embodiments, the optical imaging lens satisfies conditions as below:

$$200 < TTL/T23 < 500; \tag{7}$$

$$200 < TTL/T45 < 500; \tag{8}$$

where T23 represents a spacing distance between the second lens and the third lens on the optical axis, T45 represents a spacing distance between the fourth lens and the fifth lens on the optical axis, and TTL represents a total optical length of the optical imaging lens. If the conditions (7) and (8) are satisfied, the total length of the optical imaging lens can be compressed by reducing the spacing between the second lens and the third lens and the spacing between the fourth lens and the fifth lens, respectively. If the above conditions (6) to (8) are satisfied, by means of reasonable separation of the lenses, a lens group [1] is composed of the second lens and the third lens, and a lens group [2] is composed of the fourth lens, the fifth lens and the sixth lens, such that the lens group [1] and the lens group [2] are approximately symmetrical about the diaphragm. This symmetrical structure has the function to reduce distortion.

In some embodiments, the optical imaging lens satisfies conditions as below:

$$3.2 < Vd5Nd6 < 3.8; \quad (9)$$

$$0.8 < Nd5/Nd6 < 0.84; \quad (10)$$

where Vd5 represents an Abbe number of the fifth lens, Vd6 represents an Abbe number of the sixth lens, Nd5 represents a refractive index of the fifth lens, and Nd6 represents a refractive index of the sixth lens. If the conditions (9) to (10) are satisfied, by increasing the Abbe number difference and refractive index difference between the fifth lens and the sixth lens, the chromatic aberration can be better eliminated or reduced.

In some embodiments, the optical imaging lens satisfies conditions as below:

$$-30° < |\phi 12| - \arctan[S12/(R12^2 - S12^2)^{1/2}] < 30°; \quad (11)$$

$$-13° < |\phi 13| - \arctan[S13/(R13^2 - S13^2)^{1/2}] < 13°; \quad (12)$$

where $\phi 12$ represents a centroid angle of the object side surface of the seventh lens at an effective semi-diameter, $\phi 13$ represents a centroid angle of the image side surface of the seventh lens at an effective semi-diameter, S12 represents an effective semi-diameter of the object side surface of the seventh lens, S13 represents an effective semi-diameter of the image side surface of the seventh lens, R12 represents a radius of curvature of the object side surface of the seventh lens, and R13 represents a radius of curvature of the image side surface of the seventh lens. If the conditions (11) to (12) are satisfied, the change trend of the focal power from the center to the edge of the seventh lens approximates more closely to a cosine function. When the temperature changes, the defocus curves of all fields of view may be more convergent, and this is conducive to improvement to the temperature performance of the lens.

In some embodiments, the optical imaging lens satisfies conditions as below:

$$|\phi_{12}|_{max} \leq 20'; \quad (13)$$

$$|\phi_{13}|_{max} \leq 6'; \quad (14)$$

where $|\phi 12|max$ represents the maximum value of a centroid angle of the object side surface of the seventh lens, and $|\phi 13|max$ represents the maximum value of a centroid angle of the image side surface of the seventh lens, the centroid angle being an included angle between a line vertical to a tangent on the section of the lens surface and the horizontal direction parallel to the optical axis. If the conditions (13) to (14) are satisfied, this is beneficial to reduction of the CRA and improvement to the relative illuminance.

The invention will be further described below in a plurality of embodiments. In each of the following embodiments, various lenses in the optical imaging lens are different from each other in thickness and radius of curvature. See the parameter table in each embodiment for specific differences.

The surface shape of the aspheric surface of the optical imaging lens in each embodiment of the invention satisfies the following equation:

$$z = \frac{ch^2}{1 + \sqrt{1 - (1+K)c^2h^2}} + Bh^4 + Ch^6 + Dh^8 + Eh^{10} + Fh^{12}$$

where z represents a distance of a curve surface from the surface vertex in the direction of the optical axis, c represents a curvature of the surface vertex, K represents a quadric surface coefficient, h represents a distance from the optical axis to the curve surface, and B, C, D, E and F represent fourth-order, sixth-order, eighth-order, tenth-order and twelfth-order surface coefficients, respectively.

First Embodiment

Figure 1:
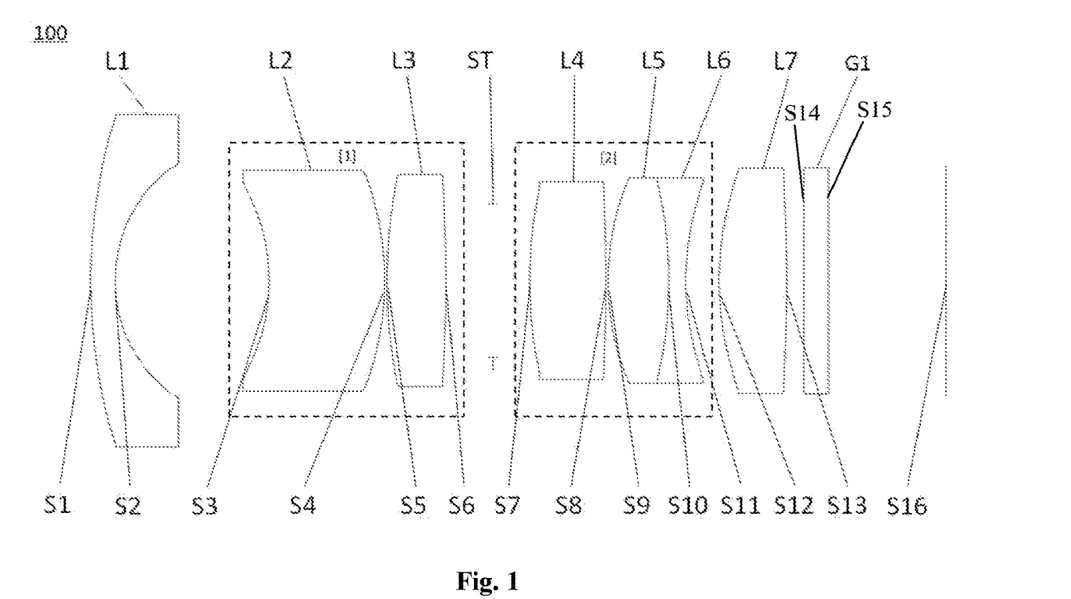
FIG. 1 illustrates a schematic diagram of a structure of an optical imaging lens in a first embodiment of the invention.

Referring to FIG. 1, illustrated is a schematic diagram of a structure of an optical imaging lens 100 provided in a first embodiment, the optical imaging lens 100 sequentially comprising, from an object side to an imaging surface along an optical axis, a first lens L1, a second lens L2, a third lens L3, a diaphragm ST, a fourth lens L4, a fifth lens L5, a sixth lens L6, a seventh lens L7, and an optical filter G1;

The first lens L1 has negative focal power, an object side surface S1 thereof being a convex surface and an image side surface S2 thereof being a concave surface;

The second lens L2 has negative focal power, an object side surface S3 thereof being a concave surface and an image side surface S4 thereof being a convex surface;

The third lens L3 has positive focal power, both an object side surface S5 and an image side surface S6 thereof being convex surfaces;

The diaphragm ST is disposed between the third lens L3 and the fourth lens L4;

The fourth lens L4 has positive focal power, both an object side surface S7 and an image side surface S8 thereof being convex surfaces;

The fifth lens L5 has positive focal power, both an object side surface S9 and an image side surface thereof being convex surfaces;

The sixth lens L6 has negative focal power, both an object side surface and an image side surface S11 thereof being concave surfaces, wherein the fifth lens L5 and the sixth lens L6 are formed into a cemented lens group, that is, the glued surface of the image side surface of the fifth lens L5 and the object side surface of the sixth lens L6 is S10; and The seventh lens L7 has positive focal power, both an object side surface S12 and an image side surface S13 thereof being convex surfaces;

wherein the first lens L1, the second lens L2, the third lens L3, the fourth lens L4, the fifth lens L5 and the sixth lens L6 are glass spherical lenses, and the seventh lens L7 is a glass aspherical lens. A lens group [1] is composed of the second lens L2 and the third lens L3, and a lens group [2] is composed of the fourth lens L4, the fifth lens L5 and the sixth lens L6.

The relevant parameters of each lens of the optical imaging lens 100 in this embodiment are shown in Table 1.

TABLE 1

| Surf. No. | | Surf. Type | Radius of Curvature (mm) | Thickness (mm) | Nd(refractive index) | Vd(Abbe number) |
|---|---|---|---|---|---|---|
| OS | | spherical | ∞ | ∞ | | |
| S1 | First Lens L1 | spherical | 20.993 | 1.001 | 1.88 | 39.2 |
| S2 | | spherical | 5.416 | 6.301 | | |
| S3 | Second Lens L2 | spherical | −7.424 | 4.734 | 1.72 | 43.7 |
| S4 | | spherical | −11.175 | 0.084 | | |
| S5 | Third Lens L3 | spherical | 19.938 | 2.406 | 1.90 | 31.3 |
| S6 | | spherical | −60.003 | 1.925 | | |
| ST | Diaphragm ST | spherical | ∞ | 1.522 | | |
| S7 | Fourth Lens L4 | spherical | 17.175 | 3.094 | 1.62 | 63.4 |
| S8 | | spherical | −72.239 | 0.101 | | |
| S9 | Fifth Lens L5 | spherical | 10.031 | 2.468 | 1.59 | 68.5 |
| S10 | Sixth Lens L6 | spherical | −16.764 | 0.690 | 1.92 | 18.9 |
| S11 | | spherical | 10.443 | 1.398 | | |
| S12 | Seventh Lens L7 | aspherical | 12.017 | 2.761 | 1.81 | 40.9 |
| S13 | | aspherical | −42.544 | 0.692 | | |
| S14 | Optical Filter G1 | spherical | ∞ | 1.000 | 1.52 | 64.2 |
| S15 | | spherical | ∞ | 4.822 | | |
| S16 | Imaging Surface | spherical | ∞ | — | | |

The parameters of the aspherical surface of each lens in this embodiment are shown in Table 2.

TABLE 2

| Surf. No | K | B | C | D | E | F |
|---|---|---|---|---|---|---|
| S12 | −6.780 | 3.859E−04 | −1.373E−05 | 1.089E−06 | −5.183E−08 | 9.481E−010 |
| S13 | 21.696 | 3.011E−04 | −6.031E−06 | 7.308E−07 | −3.363E−08 | 5.547E−010 |

Figure 2:
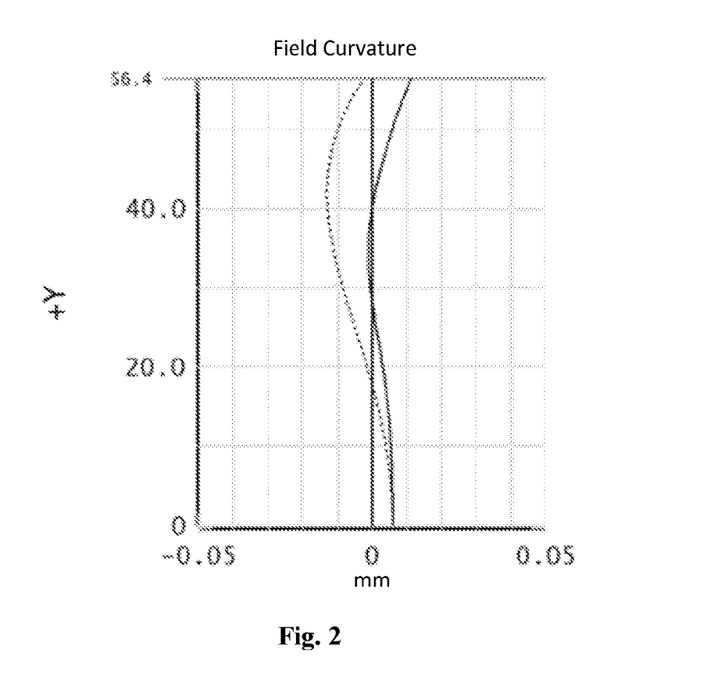
FIG. 2 illustrates a schematic diagram of a field curvature of the optical imaging lens in the first embodiment of the invention.
Figure 3:
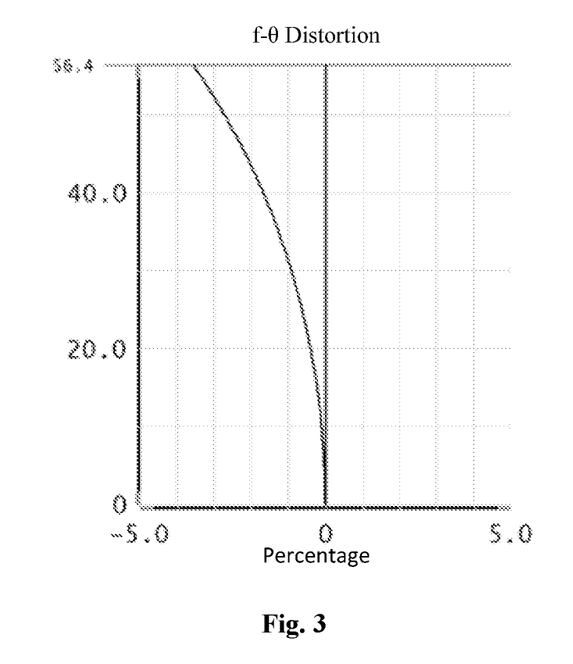
FIG. 3 is a schematic diagram of a distortion of the optical imaging lens in the first embodiment of the invention.
Figure 4:
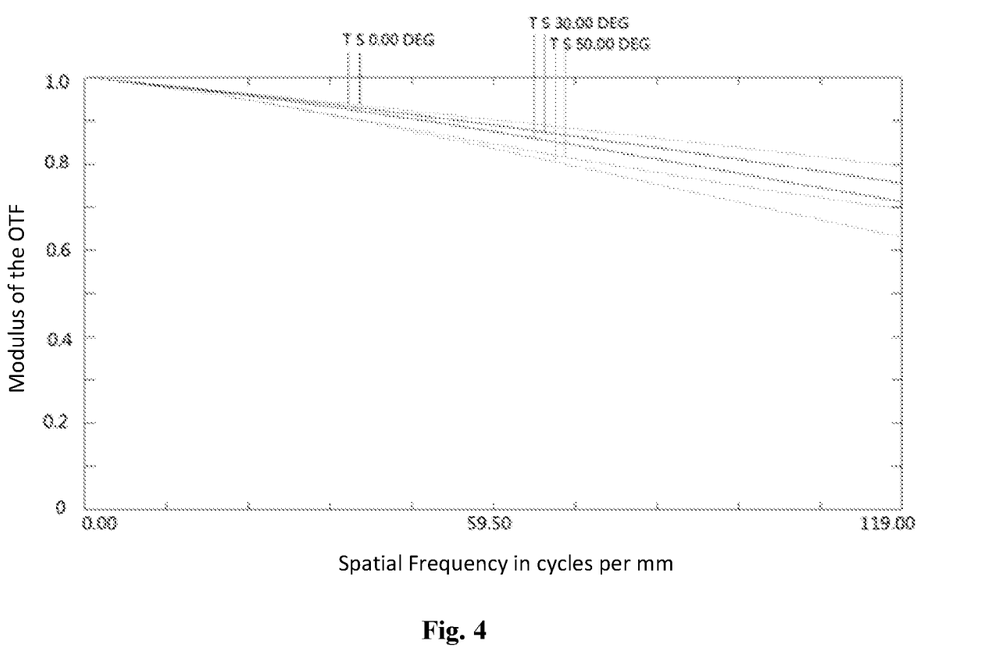
FIG. 4 is a schematic diagram of MTF of the optical imaging lens in the first embodiment of the invention.

Referring to FIGS. 2, 3 and 4, a field curvature curve, an f-θ distortion, and an MTF curve of the optical imaging lens 100 in this embodiment are shown, respectively.

The field curvature curve in FIG. 2 shows the bending degree of the tangential image surface and the sagittal image surface. Among them, the horizontal axis in FIG. 2 represents an offset (unit: mm), and the vertical axis represents an angle of field of view (unit: degree). As can be seen from FIG. 2, the field curvature of the tangential image surface and the sagittal image surface is controlled within ±0.02 mm, indicating that correction to the field curvature of the optical imaging lens is good.

The distortion curve in FIG. 3 shows a distortion at different image heights on the imaging surface. Among them, the horizontal axis in FIG. 3 represents an f-θ distortion percentage, and the vertical axis represents an angle of field of view (unit: degree). As can be seen from FIG. 3, the f-θ distortion at different image heights on the imaging surface is controlled within [−5%, 0], indicating that the distortion of the optical imaging lens has been well corrected.

The MTF curve in FIG. 4 shows a paraxial MTF of different spatial frequencies. Among them, the horizontal axis in FIG. 4 represents a spatial frequency (unit: line pair/mm), and the vertical axis represents an MTF value. As can be seen from FIG. 4, the MTF value at a paraxial position of a high frequency is about 0.6, indicating that the paraxial aberration of the optical imaging lens has been well corrected, and the optical imaging lens has high resolution as a whole.

Second Embodiment

The structure of the optical imaging lens provided in a second embodiment of the invention is substantially the same as that of the optical imaging lens 100 in the first embodiment, and the differences therebetween lie in the radius of curvature and other parameters of each lens.

The relevant parameters of each lens of the optical imaging lens in the second embodiment of the invention are shown in Table 3.

TABLE 3

| Surf. No. | | Surf. Type | Radius of Curvature (mm) | Thickness (mm) | Nd | Vd |
|---|---|---|---|---|---|---|
| OS | | spherical | ∞ | ∞ | | |
| S1 | First Lens L1 | spherical | 23.207 | 1.000 | 1.83 | 42.7 |
| S2 | | spherical | 5.349 | 6.420 | | |
| S3 | Second Lens L2 | spherical | −8.637 | 4.660 | 1.81 | 40.9 |
| S4 | | spherical | −13.253 | 0.080 | | |
| S5 | Third Lens L3 | spherical | 17.850 | 2.400 | 1.85 | 32.3 |
| S6 | | spherical | −433.327 | 0.143 | | |
| ST | Diaphragm ST | spherical | ∞ | 3.195 | | |
| S7 | Fourth Lens L4 | spherical | 12.848 | 3.129 | 1.62 | 63.4 |
| S8 | | spherical | −73.063 | 0.153 | | |
| S9 | Fifth Lens L5 | spherical | 10.962 | 3.237 | 1.59 | 68.5 |
| S10 | Sixth Lens L6 | spherical | −15.788 | 0.849 | 1.92 | 18.9 |
| S11 | | spherical | 12.407 | 0.629 | | |
| S12 | Seventh Lens L7 | aspherical | 13.842 | 2.400 | 1.81 | 40.9 |
| S13 | | aspherical | −47.622 | 0.691 | | |
| S14 | Optical Filter G1 | spherical | ∞ | 1.000 | 1.52 | 64.2 |
| S15 | | spherical | ∞ | 5.011 | | |
| S16 | Imaging Surface | spherical | ∞ | — | | |

The parameters of the aspherical surface of each lens in this embodiment are shown in Table 4.

TABLE 4

| Surf. No. | K | B | C | D | E | F |
|---|---|---|---|---|---|---|
| S12 | −2.598 | −3.095E−04 | −8.092E−06 | 4.427E−07 | −2.853E−08 | 6.936E−010 |
| S13 | 49.999 | 1.381E−04 | −7.097E−06 | 4.145E−07 | −1.928E−08 | 4.682E−010 |

Figure 5:
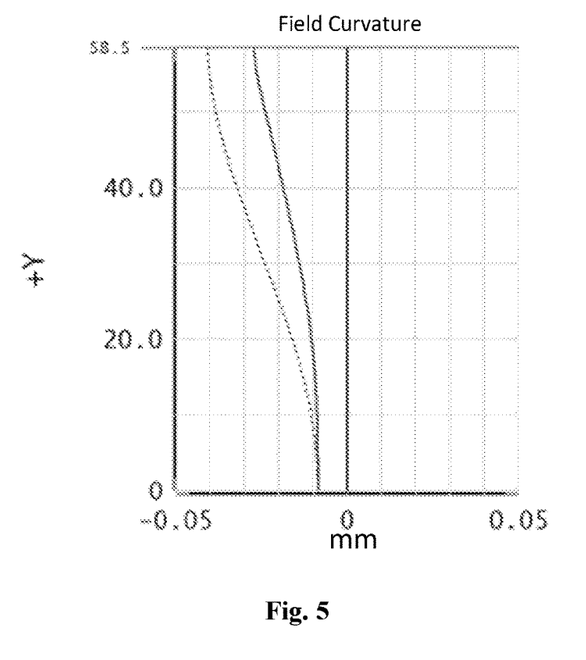
FIG. 5 is a schematic diagram of a field curvature of an optical imaging lens in a second embodiment of the invention.
Figure 6:
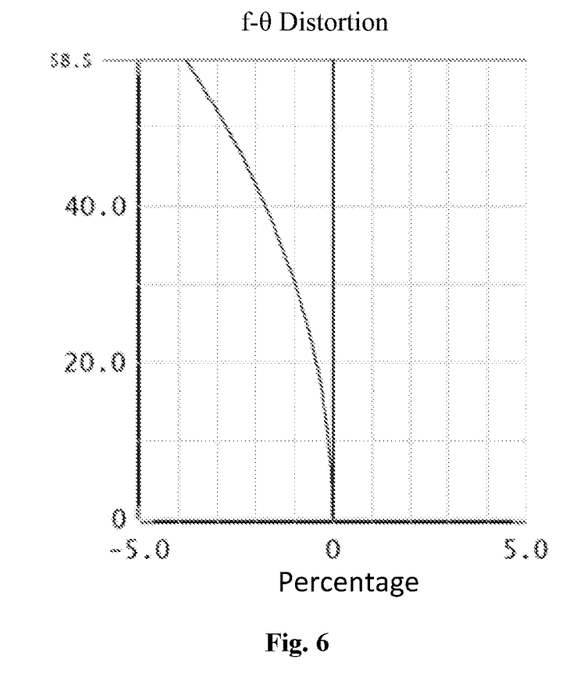
FIG. 6 is a schematic diagram of a distortion of the optical imaging lens in the second embodiment of the invention.
Figure 7:
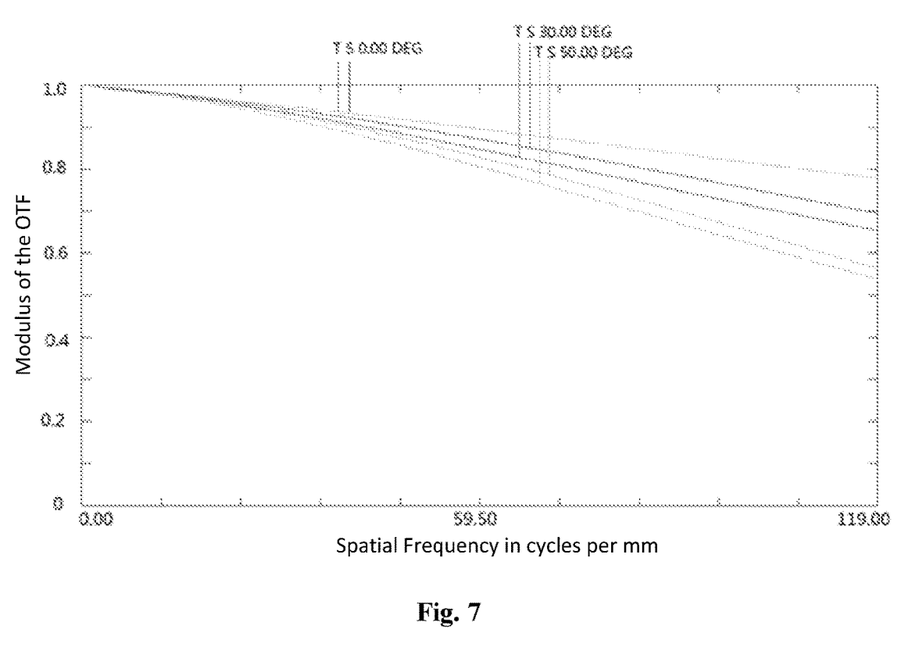
FIG. 7 is a schematic diagram of MTF of the optical imaging lens in the second embodiment of the invention.

Referring to FIGS. 5, 6 and 7, a field curvature curve, an f–θ distortion, and an MTF curve of the optical imaging lens in the second embodiment are shown, respectively. As can be seen from FIG. 5, the field curvature of the tangential image surface and the sagittal image surface is controlled within ±0.05 mm, indicating that correction to the field curvature of the optical imaging lens is good. As can be seen from FIG. 6, the f–θ distortion at different image heights on the imaging surface is controlled within [−5%, 0], indicating that the distortion of the optical imaging lens has been well corrected. As can be seen from FIG. 7, the MTF value at a paraxial position of a high frequency is about 0.5, indicating that the paraxial aberration of the optical imaging lens has been well corrected, and the optical imaging lens has high resolution.

Table 5 exhibits the corresponding optical characteristics in the above embodiments, including the focal length EFL of the system, total optical length TTL, field of view FOV, aperture number F # and the corresponding values of each condition as mentioned above.

TABLE 5

|  | Embodiment 1 | Embodiment 2 |
|---|---|---|
| TTL (mm) | 35.000 | 34.998 |
| EFL (mm) | 4.751 | 4.738 |
| FOV | 112.8° | 112.8° |
| F# | 2 | 1.9 |
| ImgH (mm) | 4.508 | 4.503 |
| TTL/ImgH | 7.764 | 7.772 |
| R6/R5 | −3.010 | −24.276 |
| R8/R7 | −4.206 | −5.687 |
| $(CRA)_{max}$ | 13.481° | 13.052° |
| f5/f6 | −1.604 | −1.553 |
| TTL/T23 | 416.667 | 437.475 |
| TTL/T34 | 10.151 | 10.485 |
| TTL/T45 | 343.137 | 228.745 |
| Vd5/Vd6 | 3.624 | 3.624 |
| Nd5/Nd6 | 0.828 | 0.828 |
| $|\phi_{12}|$-arctan$[S12/(R12^2 − S12^2)^{1/2}]$ | −27.271° | −10.184° |
| $|\phi_{13}|$-arctan$[S13/(R13^2 − S13^2)^{1/2}]$ | −11.057° | −0.123° |
| $|\phi_{12}|_{max}$ | 19.947° | 9.702° |
| $|\phi_{13}|_{max}$ | 2.531° | 5.275° |

Third Embodiment

Figure 8:
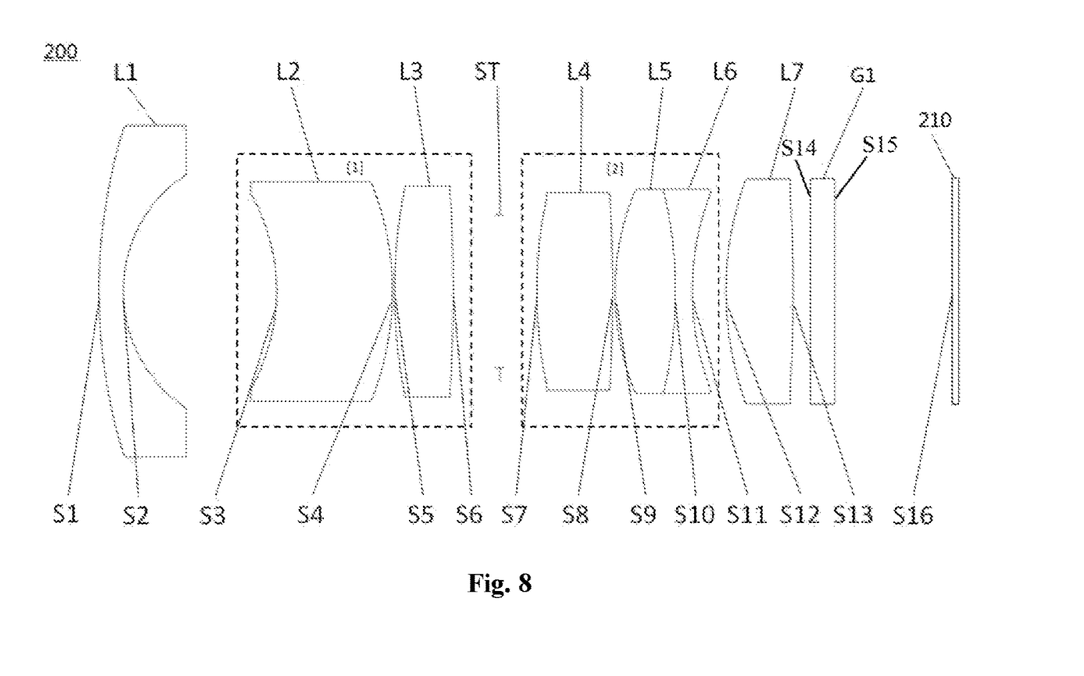
FIG. 8 is a schematic diagram of a structure of imaging equipment provided in the third embodiment of the invention.

Referring to FIG. 8, a third embodiment of the invention provides an imaging equipment 200, which may comprise an imaging element 210 and an optical imaging lens in any one of the aforesaid embodiments, for example the optical imaging lens 100. The imaging element 210 may be a CMOS (Complementary Metal Oxide Semiconductor) image sensor, or a CCD (Charge Coupled Device) image sensor.

The imaging equipment 200 may be a vehicle-mounted monitor, UAV, panoramic camera and any other forms of electronic device equipped with the optical imaging lens.

The imaging equipment 200 provided in this embodiment comprises an optical imaging lens in any one of the aforesaid embodiments. Because the optical imaging lens has the characteristics such as ultra-high resolution, good thermal stability, large imaging surface and convenience of assembly, the imaging equipment 200 gains the advantages of high imaging quality, large target surface and good thermal stability.

To describe the specification, reference to the terms such as "one embodiment", "some embodiments", "illustration", "specific illustration", or "some illustrations" means that the specific features, structures, materials or characteristics as described in connection with the embodiment or illustration are included in at least one embodiment or illustration of the invention. In the specification, the schematic expression of the above terms does not necessarily refer to the same embodiment or illustration. Furthermore, the specific features, structures, materials or characteristics as described may be combined in a suitable manner in any one or more of the embodiments or illustrations.

The embodiments recited above only express several embodiments of the invention. Although the description of them is relatively specific and detailed, they cannot be accordingly understood as limitations of the scope of this patent for invention. It should be pointed out that for those skilled in the art, several modifications and improvements may be further made without departing from the concept of the invention, which all belong to the scope of protection of the invention. Therefore, the scope of protection of this patent for the invention should be subject to the appended claims.

We claim:

1. An optical imaging lens, sequentially comprising, from an object side to an imaging surface along an optical axis:

a first lens having negative focal power, an object side surface thereof being a convex surface and an image side surface thereof being a concave surface;

a second lens having negative focal power, an object side surface thereof being a concave surface and an image side surface thereof being a convex surface;

a third lens having positive focal power, both an object side surface and an image side surface thereof being convex surfaces;

a diaphragm;

a fourth lens having positive focal power, both an object side surface and an image side surface thereof being convex surfaces;

a fifth lens having positive focal power, both an object side surface and an image side surface thereof being convex surfaces;

a sixth lens having negative focal power, both an object side surface and an image side surface thereof being concave surfaces, and the fifth lens and the sixth lens forming a cemented lens group; and a seventh lens having positive focal power, both an object side surface and an image side surface thereof being convex surfaces, wherein the optical imaging lens satisfies conditions:

$R6/R5 < −2.8$;

$−5.8 < R8/R7 < −3.8$;

where R5 represents a radius of curvature of the object side surface of the third lens, R6 represents a radius of curvature of the image side surface of the third lens, R7 represents a radius of curvature of the object side surface of the fourth lens, and R8 represents a radius of curvature of the image side surface of the fourth lens.

2. The optical imaging lens according to claim 1, wherein the optical imaging lens satisfies a condition:

$$(CRA)_{max} < 14°;$$

where $(CRA)_{max}$ represents the maximum value of an incident angle of full-field chief rays of the optical imaging lens on the image surface.

3. The optical imaging lens according to claim 1, wherein the optical imaging lens satisfies a condition:

$$-1.8 < f5/f6 < -1.4;$$

where f5 represents a focal length of the fifth lens, and f6 represents a focal length of the sixth lens.

4. The optical imaging lens according to claim 1, wherein the optical imaging lens satisfies a conditional formula:

$$9 < TTL/T34 < 11;$$

where T34 represents a spacing distance between the third lens and the fourth lens on the optical axis, and TTL represents a total optical length of the optical imaging lens.

5. The optical imaging lens according to claim 1, wherein the optical imaging lens satisfies conditions:

$$200 < TTL/T23 < 500;$$

$$200 < TTL/T45 < 500;$$

where T23 represents a spacing distance between the second lens and the third lens on the optical axis, T45 represents a spacing distance between the fourth lens and the fifth lens on the optical axis, and TTL represents a total optical length of the optical imaging lens.

6. The optical imaging lens according to claim 1, wherein the optical imaging lens satisfies conditions:

$$3.2 < Vd5/Vd6 < 3.8;$$

$$0.8 < Nd5/Nd6 < 0.84;$$

where Vd5 represents an Abbe number of the fifth lens, Vd6 represents an Abbe number of the sixth lens, Nd5 represents a refractive index of the fifth lens, and Nd6 represents a refractive index of the sixth lens.

7. The optical imaging lens according to claim 1, wherein the optical imaging lens satisfies conditions:

$$-30° < |\phi12| - \arctan[S12/(R12^2 - S12^2)^{1/2}] < 30°;$$

$$-13° < |\phi13| - \arctan[S13/(R13^2 - S13^2)^{1/2}] < 13°;$$

where $\phi12$ represents a centroid angle of the object side surface of the seventh lens at an effective semi-diameter, $\phi13$ represents a centroid angle of the image side surface of the seventh lens at an effective semi-diameter, S12 represents an effective semi-diameter of the object side surface of the seventh lens, S13 represents an effective semi-diameter of the image side surface of the seventh lens, R12 represents a radius of curvature of the object side surface of the seventh lens, and R13 represents a radius of curvature of the image side surface of the seventh lens, the centroid angle being an included angle between a line vertical to a tangent on the section of the lens surface and a horizontal direction parallel to the optical axis.

8. The optical imaging lens according to claim 1, wherein the optical imaging lens satisfies conditions:

$$|\phi_{12}|_{max} \leq 20°;$$

$$|\phi_{13}|_{max} \leq 6°;$$

where $|\phi_{12}|_{max}$ represents the maximum value of a centroid angle of the object side surface of the seventh lens, and $|\phi_{13}|_{max}$ represents the maximum value of a centroid angle of the image side surface of the seventh lens, the centroid angle being an included angle between a line vertical to a tangent on the section of the lens surface and a horizontal direction parallel to the optical axis.

9. An imaging equipment, comprising an optical imaging lens, and an imaging element for converting an optical image formed by the optical imaging lens into an electrical signal, wherein the optical imaging lens sequentially comprises, from an object side to an imaging surface along an optical axis:

a first lens having negative focal power, an object side surface thereof being a convex surface and an image side surface thereof being a concave surface;

a second lens having negative focal power, an object side surface thereof being a concave surface and an image side surface thereof being a convex surface;

a third lens having positive focal power, both an object side surface and an image side surface thereof being convex surfaces;

a diaphragm;

a fourth lens having positive focal power, both an object side surface and an image side surface thereof being convex surfaces;

a fifth lens having positive focal power, both an object side surface and an image side surface thereof being convex surfaces;

a sixth lens having negative focal power, both an object side surface and an image side surface thereof being concave surfaces, and the fifth lens and the sixth lens forming a cemented lens group; and a seventh lens having positive focal power, both an object side surface and an image side surface thereof being convex surfaces, wherein the optical imaging lens satisfies conditions:

$$R6/R5 < -2.8;$$

$$-5.8 < R8/R7 < -3.8;$$

where R5 represents a radius of curvature of the object side surface of the third lens, R6 represents a radius of curvature of the image side surface of the third lens, R7 represents a radius of curvature of the object side surface of the fourth lens, and R8 represents a radius of curvature of the image side surface of the fourth lens.

10. The optical imaging lens according to claim 1, wherein the first lens, the second lens, the third lens, the fourth lens, the fifth lens and the sixth lens are glass spherical lenses, and the seventh lens is a glass aspherical lens; and the optical imaging lens satisfies a condition:

$$7 < TTL/ImgH < 8,$$

where TTL represents a total optical length of the optical imaging lens, and ImgH represents half of the maximum diameter of an effective pixel area of the optical imaging lens on the imaging surface.

11. The imaging equipment according to claim 9, wherein the optical imaging lens satisfies a condition:

$(CRA)_{max} < 14°$;

where $(CRA)_{max}$ represents the maximum value of an incident angle of full-field chief rays of the optical imaging lens on the image surface.

12. The imaging equipment according to claim 9, wherein the optical imaging lens satisfies a condition:

$-1.8 < f5/f6 < -1.4$;

where f5 represents a focal length of the fifth lens, and f6 represents a focal length of the sixth lens.

13. The imaging equipment according to claim 9, wherein the optical imaging lens satisfies a conditional formula:

$9 < TTL/T34 < 11$;

where T34 represents a spacing distance between the third lens and the fourth lens on the optical axis, and TTL represents a total optical length of the optical imaging lens.

14. The imaging equipment according to claim 9, wherein the optical imaging lens satisfies conditions:

$200 < TTL/T23 < 500$;

$200 < TTL/T45 < 500$;

where T23 represents a spacing distance between the second lens and the third lens on the optical axis, T45 represents a spacing distance between the fourth lens and the fifth lens on the optical axis, and TTL represents a total optical length of the optical imaging lens.

15. The imaging equipment according to claim 9, wherein the optical imaging lens satisfies conditions:

$3.2 < Vd5/Vd6 < 3.8$;

$0.8 < Nd5/Nd6 < 0.84$;

where Vd5 represents an Abbe number of the fifth lens, Vd6 represents an Abbe number of the sixth lens, Nd5 represents a refractive index of the fifth lens, and Nd6 represents a refractive index of the sixth lens.

16. The imaging equipment according to claim 9, wherein the optical imaging lens satisfies conditions:

$-30° < |\phi 12| - \arctan[S12/(R12^2 - S12^2)^{1/2}] < 30°$;

$-13° < |\phi 13| - \arctan[S13/(R13^2 - S13^2)^{1/2}] < 13°$;

where $\phi 12$ represents a centroid angle of the object side surface of the seventh lens at an effective semi-diameter, $\phi 13$ represents a centroid angle of the image side surface of the seventh lens at an effective semi-diameter, S12 represents an effective semi-diameter of the object side surface of the seventh lens, S13 represents an effective semi-diameter of the image side surface of the seventh lens, R12 represents a radius of curvature of the object side surface of the seventh lens, and R13 represents a radius of curvature of the image side surface of the seventh lens, the centroid angle being an included angle between a line vertical to a tangent on the section of the lens surface and a horizontal direction parallel to the optical axis.

17. The imaging equipment according to claim 9, wherein the optical imaging lens satisfies conditions:

$|\phi_{12}|_{max} \leq 20'$;  (13)

$|\phi_{13}|_{max} \leq 6'$;  (14)

where $|\phi_{12}|_{max}$ represents the maximum value of a centroid angle of the object side surface of the seventh lens, and $|\phi_{13}|_{max}$ represents the maximum value of a centroid angle of the image side surface of the seventh lens, the centroid angle being an included angle between a line vertical to a tangent on the section of the lens surface and a horizontal direction parallel to the optical axis.

18. The imaging equipment according to claim 9, wherein the first lens, the second lens, the third lens, the fourth lens, the fifth lens and the sixth lens are glass spherical lenses, and the seventh lens is a glass aspherical lens; and the optical imaging lens satisfies a condition:

$7 < TTL/ImgH < 8$, where TTL represents a total optical length of the optical imaging lens, and ImgH represents half of the maximum diameter of an effective pixel area of the optical imaging lens on the imaging surface.

19. An optical imaging lens, sequentially comprising, from an object side to an imaging surface along an optical axis:

a first lens having negative focal power, an object side surface thereof being a convex surface and an image side surface thereof being a concave surface;

a second lens having negative focal power, an object side surface thereof being a concave surface and an image side surface thereof being a convex surface;

a third lens having positive focal power, both an object side surface and an image side surface thereof being convex surfaces;

a diaphragm;

a fourth lens having positive focal power, both an object side surface and an image side surface thereof being convex surfaces;

a fifth lens having positive focal power, both an object side surface and an image side surface thereof being convex surfaces;

a sixth lens having negative focal power, both an object side surface and an image side surface thereof being concave surfaces, and the fifth lens and the sixth lens forming a cemented lens group; and a seventh lens having positive focal power, both an object side surface and an image side surface thereof being convex surfaces, wherein the optical imaging lens satisfies a conditional formula:

$9 < TTL/T34 < 11$;

where T34 represents a spacing distance between the third lens and the fourth lens on the optical axis, and TTL represents a total optical length of the optical imaging lens.

* * * * *